CODE TRANSLATING CIRCUIT
Filed Dec. 30, 1960 2 Sheets-Sheet 1
TWO OF FIVE CODE CORES
| DECIMAL CORES | 0′ | 1′ | 2′ | 3′ | 6′ |
|---|---|---|---|---|---|
| 0 | 0 | 1 | 1 | 0 | 0 |
| 1 | 1 | 1 | 0 | 0 | 0 |
| 2 | 1 | 0 | 1 | 0 | 0 |
| 3 | 1 | 0 | 0 | 1 | 0 |
| 4 | 0 | 1 | 0 | 1 | 0 |
| 5 | 0 | 0 | 1 | 1 | 0 |
| 6 | 1 | 0 | 0 | 0 | 1 |
| 7 | 0 | 1 | 0 | 0 | 1 |
| 8 | 0 | 0 | 1 | 0 | 1 |
| 9 | 0 | 0 | 0 | 1 | 1 |
FIG. 4
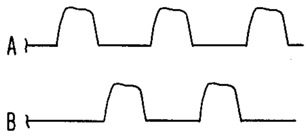
FIG. 3
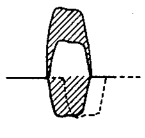
FIG. 2a
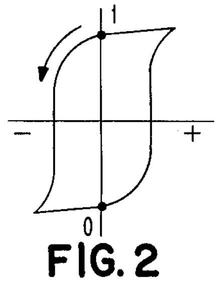
FIG. 2
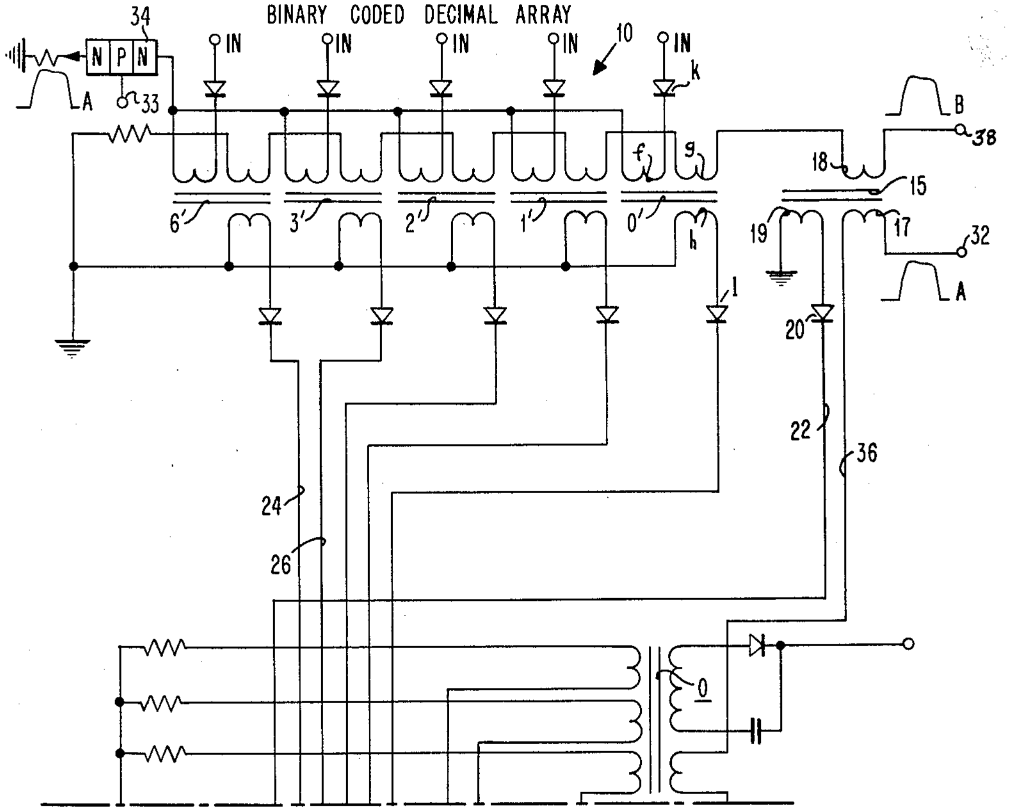
FIG. 1a
INVENTOR
MARTIN J. KELLY
BY Leo J. Aubel
ATTORNEY Dec. 4, 1962 M. J. KELLY 3,067,414
CODE TRANSLATING CIRCUIT
Filed Dec. 30, 1960 2 Sheets-Sheet 2

United States Patent Office 3,067,414
Patented Dec. 4, 1962

3,067,414
CODE TRANSLATING CIRCUIT

Martin J. Kelly, Endwell, N.Y., assignor to International Business Machines Corporation, New York, N.Y., a corporation of New York Filed Dec. 30, 1960, Ser. No. 79,794
4 Claims. (Cl. 340—347)

This invention relates generally to magnetic element switching devices and more particularly to a code translating circuit including means assuring the accuracy of translation.

Code translating devices are necessary in many applications in computers and related fields. In translating circuits comprising bistable magnetic elements, and particularly magnetic cores, a full select current is utilized to shift the cores from one to the other of their bistable states. To obtain proper operation of code translating circuits, biasing pulses are applied to assure that only the desired cores are caused to shift magnetic states to provide the desired indication, and thence to obtain continuity of operation, sense-reset pulses are applied to return the cores to an initial condition before a next input signal is applied thereto. In prior art circuitry, when translating from a first input code to a second input code, for example, when translating from a binary-coded-decimal input code into a decimal output code, biasing pulses are applied separately from the sense-reset pulses. A disadvantage in such prior art circuitry is that the biasing pulses may be of different duration than the sense-reset pulses, or the biasing pulses may not be coincident with the sense-reset pulses. For example, note the biasing pulse indicated by the dotted waveform in FIG. 2*a*. Since full select current is applied to the cores, the foregoing conditions may cause pull-back in the cores of the decimal array which are intended to be set. Pull-back refers to the phenomenon which occurs if, for example, a core has been set to a first condition "1," as seen in FIG. 2, and the slightly later-in-time negative biasing pulse, as shown by the dotted lines in FIG. 2*a*, causes the core to tend to shift back down the hysteresis curve toward a negative magnetization "0". This undesirable pull-back effect becomes more pronounced and more critical if the hysteresis curve of the cores used is not square, i.e., rectangular.

Accordingly, it is a principal object of the present invention to provide a code translating circuit utilizing magnetic cores in which the biasing pulses and the sense-reset pulses are coincident.

It is another object of the present invention to provide a code translating circuit utilizing magnetic cores and including means for assuring that pull-back of the cores is prevented.

It is another object of the present invention to provide a code translating circuit utilizing magnetic cores, which cores need not have a square hysteresis loop.

In the attainment of the foregoing objects, there are provided first and second arrays of magnetic cores each including a plurality of windings, the first array being arranged to receive an input signal in a first input code, the second array of cores being arranged to receive an output from said first array and to provide a signal in a second output code in response to said first input code signal, and control core means including a plurality of windings. A first winding on said control core is connected to windings on said first array and is arranged to reset said first array of cores; a second winding on said control core is connected to windings on said second array to reset said second array; a third winding on said control core provides a full select biasing current energization to said second array during that period in which pulse energy is being transferred from said first array to said second array to assure that only one core in said second array is selected in accordance with the input signal to provide an output signal.

The foregoing and other objects, features and advantages of the invention will be apparent from the following more particular description of a preferred embodiment of the invention, as illustrated in the accompanying drawings.

In the drawings:

FIGS. 1*a* and 1*b* show a schematic diagram of a core translating circuitry in accordance with the invention;

FIG. 2 shows a hysteresis curve, and

FIG. 2*a* shows waveforms useful in explaining pull-back phenomenon; FIG. 2*a* is also useful in explaining the relation of the biasing pulses to the setting pulses;

FIG. 3 is a timing diagram showing the timing relation of the A and B pulses applied to the circuitry of FIG. 1;

FIG. 4 is a table showing the translation from a binary-coded-decimal and, more specifically, a 2 out of 5 code into a decimal code.

Figure 1B:
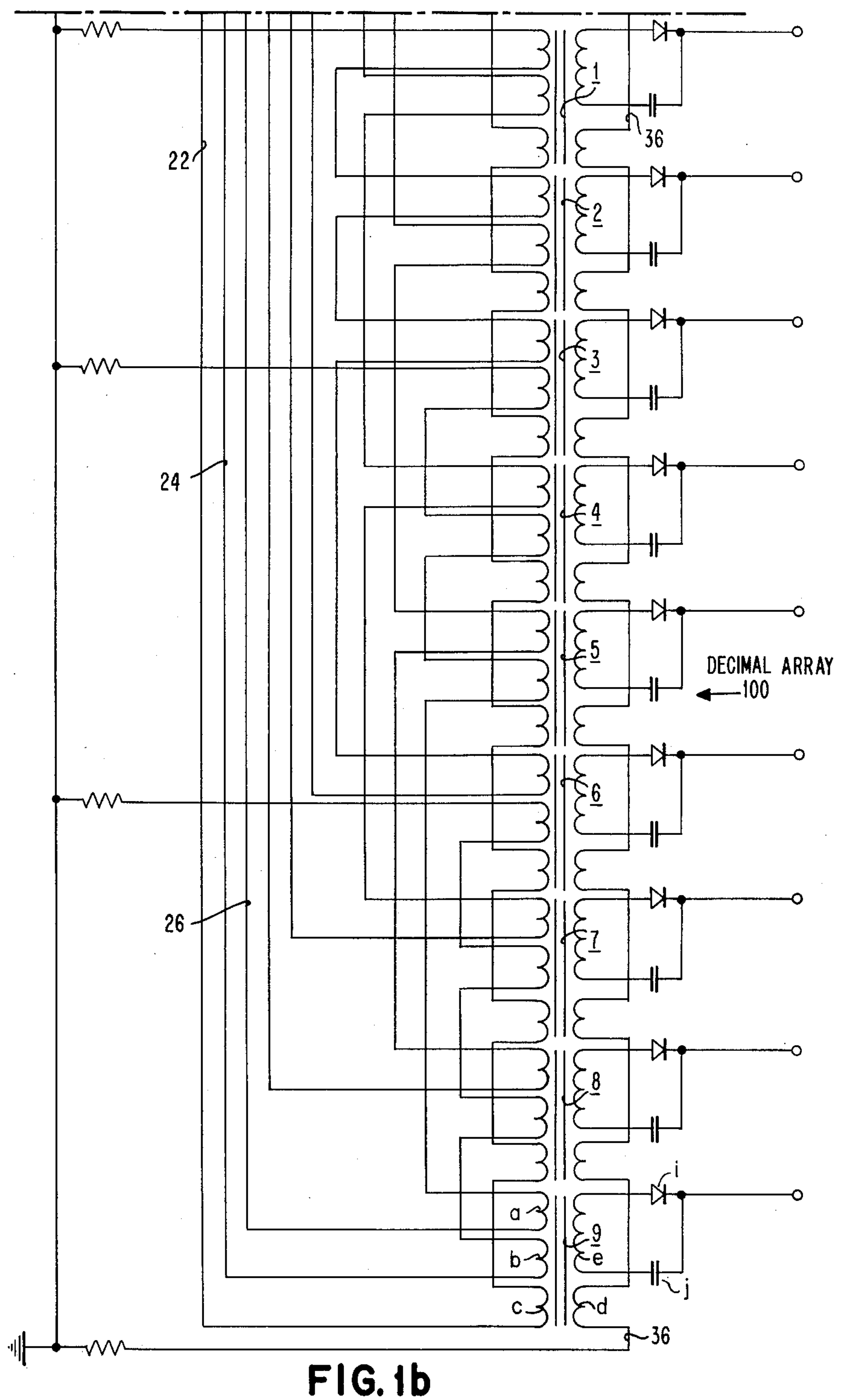

Referring to FIGS. 1*a* and 1*b*, the code translating circuitry according to the invention includes a first core array 10 arranged to receive a binary-coded-decimal signal, and more specifically a 2 out of 5 code; and, a one out of ten decimal core array 100 connected to core array 10 and arranged to provide a decimal code output signal on one output terminal in response to a 2 out of 5 input code signal.

Each of the bistable magnetic or saturable cores 0′, 1′, 2′, 3′ and 6′ in the binary-coded-decimal array 10 includes an input winding *f*, a reset winding *g*, and an output winding *h*. In FIG. 1*a*, only the windings on core 0′ are lettered.

The magnetic cores in the decimal array 100, indicated by the numerals 0, 1, 2 . . . 9, include two input windings *a* and *b*, a biasing winding *c*, a set winding *d*, and an output winding *e*. The signal from output winding *e* is coupled through a diode *i* and across a capacitor *j* to a utilization circuit, not shown. In FIG. 1*b*, only the windings on core 9 are lettered.

The output windings *h* of the cores in the array 10 are connected through diodes *l* to selected ones of the input *a* and *b* windings in the decimal array 100. The output windings *h* of two of the cores in the array 10 are connected to an input winding of each of the cores of the decimal array to provide the desired decimal output. For example, windings *h* of cores 3′ and 6′ are connected through leads 26 and 24 respectively to windings *a* and *b* of decimal core 9; likewise, windings *h* of the other cores in array 10 are coupled to windings *a* and *b* of associated cores in the decimal array 100, as is well known in the art.

The binary-code-decimal signals, i.e., the 2 out of 5 coded signals, are connected to input terminals indicated as In through diodes *k* to the respective input windings *f* of core array 10. As is known in the art, and as indicated in the table of FIG. 4, the input coded signal selectively energizes two cores in the 2 out of 5 array during each individual translating period. The numeral "1" indicates an energization of a core to a positive magnetization or a set condition, and "0" indicates an energization of a core to a negative magnetization or reset condition. Cores 0′, 1′, 2′, 3′ and 6′ are selectively energized to indicate numerals 0, 1, 2, 3 and 6, respectively.

Input windings *f* of array 10 are connected in parallel to a transistor switch 34 of any suitable known type. In order for windings *f* to be energized, a signal is coupled to terminal 33 of transistor switch 34 to permit current flow therethrough concurrently as the input code signals are applied to array 10.

Diodes *k* and *l* are connected respectively to the input windings *f* and the output windings *h* of core array 10. Only the diodes *k* and *l* connected to windings *f* and *h* respectively of core 0' are lettered in FIG. 1. Diodes *k* assure that only signals of one polarity will energize windings *f*, and diodes *l* assure that only signals of one polarity will be coupled from the output windings *h* of array 10 to the input windings *a* and *b* of the decimal array 100.

The circuit of FIGS. 1*a* and 1*b* also includes biasing and reset control core 15 which has a reset winding 17 for resetting the decimal array 100, a biasing winding 19, and a reset winding 18 for resetting the binary-coded-decimal array 10.

The reset winding 17 is connected through lead 36 in series with the reset windings *d* of all the cores in decimal array 100 and is utilized to energize windings *d* to reset the cores in array 100. The sense-reset winding 18 is connected in series with the reset windings *g* of all the cores in array 10 and is utilized to energize windings *g* to reset the cores in array 100. The biasing winding 19 is connected through a diode 20 and lead 22 in series with the biasing windings *c* of all the cores in array 100 and is utilized to provide a full select biasing current during each code translating period, as will be described in detail hereinbelow.

The operation of the circuit follows:

Pulse A is initially applied to terminal 32 connected to winding 17 of control core 15 and to terminal 33 connected to a transistor switch 34. As noted, as pulse A is applied, the input signal in the aforementioned 2 out of 5 code is concurrently applied to binary-coded-decimal array 10. For purpose of discussion, assume input windings *f* in each of cores 3' and 6' are energized by the input signal.

The A pulse applied to terminal 32 is connected through reset winding 17 and lead 36 in series to each of the reset windings *d* of the decimal array 100. Windings *d* of the decimal array are wound to reset the cores of the decimal array to an initial state when current flows therein. The A pulse applied to terminal 32 also develops a voltage across winding 19 of core 15; however, diode 20 in lead 22 connecting to the biasing windings *c* of the decimal array 100 is poled to prevent conduction when core 15 is energized by the A pulse. The voltage developed across winding 18 by the A pulse also energizes windings *g* in array 10; however, the potential developed across the energized ones of input windings *f* of array 10 overcomes the effect of the current flow through winding *g*; consequently, two of the five cores (in this case cores 3' and 6') are set to a positive magnetization or "1" by the input signal.

Next, a later-in-time pulse B is applied to terminal 38 of winding 18 of core 15, see FIG. 3; since winding 18 is connected in series with windings *g* of the cores in array 10, pulse B is applied in series to each of cores 0', 1', 2', 3' and 6' to reset the cores which have been energized by the input signal to an initial or "0" stable state. The pulse developed across each of the output windings *h* of array 10, as the energized ones of cores 0', 1', 2', 3' and 6' are reset, cause diodes *l* to be forward biased and a full select current is coupled to the input windings *a* and *b* of associated cores in the decimal array 100.

Pulse B also causes a pulse to be induced in winding 19 of core 15, which pulse forward biases diode 20 and causes a full select current to be coupled through lead 22 to the biasing windings *c* of all the cores in the decimal array. Current flowing through biasing windings *c* tends to cause the cores in array 100 to reset or shift to a "0" or negative magnetization.

Thus, when the two energized ones of the cores in the array 10 are reset by the B pulse, two full select currents are provided to a selected one of the cores in the decimal array 100 to shift the selected core in array 100 toward a positive or "1" state. For example, assuming that cores 3' and 6' were initially set and are now reset; full select currents will be applied through leads 24 and 26, to windings *a* and *b* of core 9 in the decimal array 100. Various other cores in the decimal array will receive a full select current to either, but not both, of their *a* or their *b* windings from either core 3' or core 6'. However, concurrently as the B pulse is applied through winding 18 of control core 15 to reset the cores in array 10, a voltage is also induced in winding 19 of control core 15 which forward biases diode 20, and a full select current is coupled through lead 22 to the biasing windings *c* of all the cores in the decimal array 100. As noted above, a full select current flowing through windings *c* tends to shift or reset the cores in array 100 to their reset, initial or "0" state. Consequently, the single full select current provided by array 10 tending to set the cores in array 100 to a positive or "1" condition will be effectively cancelled by the biasing current flowing through the biasing windings *c*; this is indicated by the cross-hatched lines of FIG. 2*a*. Thus, only at core 9 where two full select currents are applied by cores 3' and 6' will the total effect be that of a full select current tending to set core 9 to state "1," and thus to provide an output through its associated diode *i* to the utilization circuitry; this is indicated by the non-cross-hatched waveform of FIG. 2*a*.

While the invention has been particularly shown and described with reference to a preferred embodiment thereof, it will be understood by those skilled in the art that various changes in form and details may be made therein without departing from the spirit and scope of the invention.

What is claimed is:

1. In a code translating circuit comprising a first input and a second output array of magnetic cores having a reset and set stable condition, the cores in said arrays each including a plurality of windings, a control core having a plurality of windings, distinct windings of said control core being connected to windings of cores in said first and second arrays for controlling the resetting of the cores in said arrays, windings on the cores in said first array being connected in selected combination to winding of said cores in said second array for providing energy coupling therebetween, means for setting selected cores in said first array in response to an input signal, means for energizing said control core to provide a bias signal to the cores in said second array concurrently as said first array is reset whereby the setting and resetting currents flowing through the windings of the cores in said second array cancel except the current flowing through the windings of one core to thereby cause said one core to shift conditions and provide an output signal.

2. In a code translating circuit including first and second arrays of magnetic cores each having an initial or reset and a set state, the cores in said arrays each having a plurality of windings, said first array arranged to receive signals in a first code, said second array arranged to be energized by said first array and provide an output signal in a second code, the combination comprising, windings on said cores in said first array being connected in selected combinations to windings on the cores of said second array, a control core having a plurality of windings, a first winding of said control core being connected to windings on the cores of said second array and a second winding of said control core being connected to windings on the cores of said first array, a first pulse applied to said first winding of said control core causing a current flow in windings of the cores of said second array to thereby reset said cores, means for coupling a first code signal to said first array concurrently as said first pulse is applied for overcoming said pulse and setting selected ones of the cores in said first array, said second winding of said control core arranged to receive a second pulse for resetting said selected cores in said first array to additively provide through a selected winding combination the equivalent of more than a full select currents for setting one core in said second array and a full select current for setting the other cores in said second array, and said second pulse also causing a full select current to be coupled to tend to reset the cores in said second array whereby all the setting and resetting currents flowing through the windings of the cores in said second array cancel except for a full select current flowing through the windings of said one core to thereby cause said one core to shift states and provide an output signal in said second code.

3. In a code translating circuit, the combination comprising, first and second arrays of magnetic cores each having an initial or reset and a set state, the cores in said first array each including an input winding, a reset winding, and an output winding, the cores in said second array each including a pair of input windings, a biasing winding, a reset winding, and an output winding, said output windings on the cores in said first array being connected in selected combinations to said input windings of said cores in said second array, said first array arranged to receive a signal in a first code, said second array arranged to be energized by said first array and to provide an output signal in a second code, a control core having first and second control windings and an output winding, said first and second control windings being connected in series with the reset windings of the cores in said first and second arrays respectively, said output winding of said control core being connected in series with the biasing windings of the cores in said second array, a first device for permitting only unidirectional current flow from said output winding to said biasing windings of the cores in said second array, any current flowing through said biasing windings tending to reset the associated cores, said first control winding arranged to receive a first pulse for resetting said cores in said second array, means for coupling a coded signal to selected ones of the cores in said first array to thereby set said selected cores concurrently as said first pulse is applied, second devices connected for preventing current flow from said first array to said second array when the cores in said first array are set, a second pulse applied to a second input winding resetting the cores in said first array which have been energized as a result of said coded input signal, said second devices associated with said energized cores being biased to conduct when said energized cores of said first array are reset to provide an output to set the associated ones of the cores in said second array, and the voltage induced in said output winding of said control core when said second pulse is applied causing said first device to conduct to permit a full select current to flow through biasing windings of the cores in said second array whereby all the currents through the cores in said second array cancel except the current flowing through the core associated with the selected cores in said first array to thereby provide an output in a second code.

4. A circuit in accordance with claim 3 in which said devices are diodes.

References Cited in the file of this patent

UNITED STATES PATENTS 2,733,861 Rajchman ---------------- Feb. 7, 1956